April 9, 1968     A. P. MANONI     3,376,714
CLUTCH ASSEMBLY
Filed Feb. 28, 1966
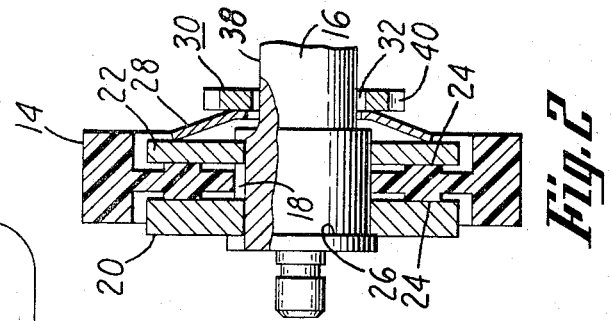
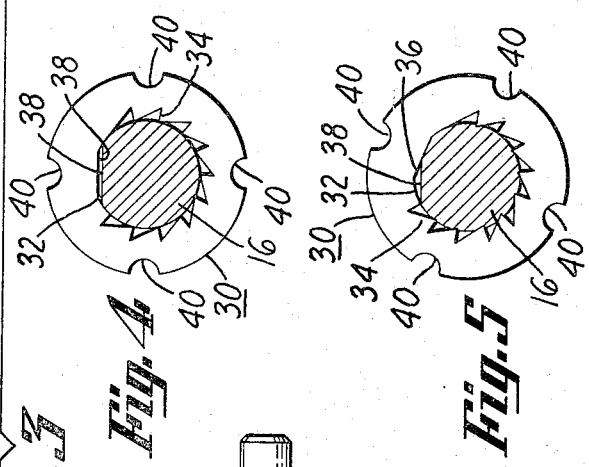
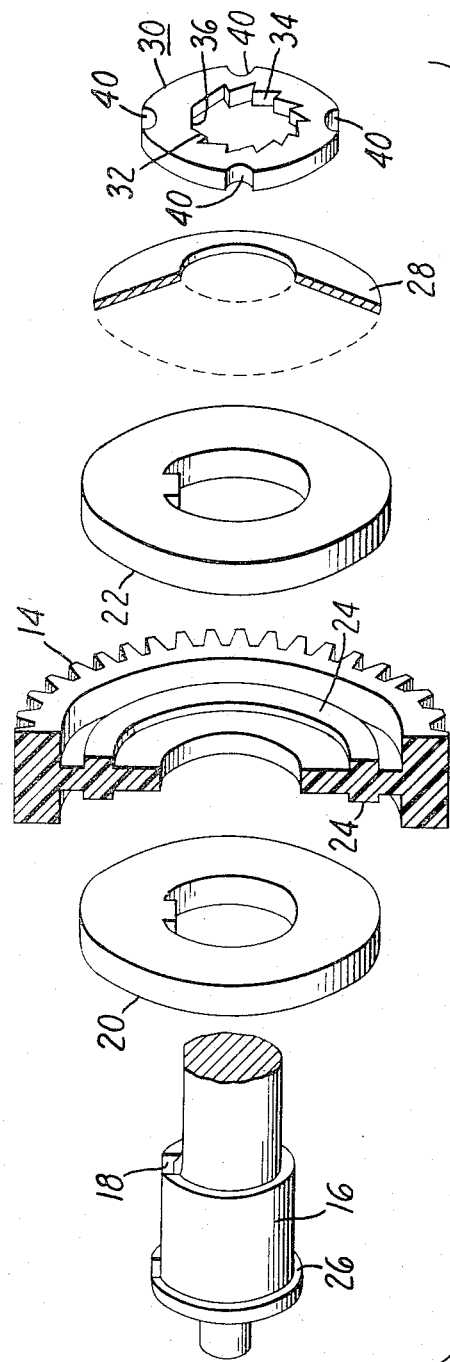
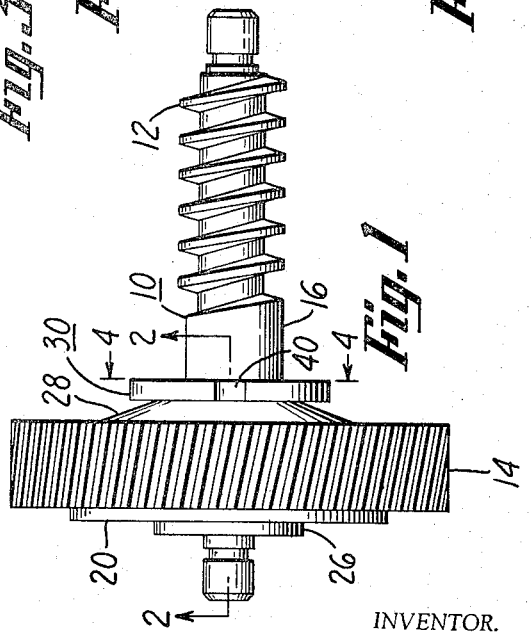
INVENTOR.
ARTHUR P. MANONI
BY
Donald P. Selwicki
ATTORNEY

United States Patent Office 3,376,714
Patented Apr. 9, 1968

3,376,714
CLUTCH ASSEMBLY
Arthur P. Manoni, Rochester, N.Y., assignor to General Motors Corporation, Detroit, Mich., a corporation of Delaware
Filed Feb. 28, 1966, Ser. No. 530,417
4 Claims. (Cl. 64—30)

ABSTRACT OF THE DISCLOSURE

In a preferred form, the subject invention covers a clutch arrangement for use with an electrically driven gear that will allow use of an electric motor as a servo without the need for limit switches. The present invention includes a novel locking washer arrangement which is pressed against a Belleville type spring to preload the spring a predetermined amount and then is turned on the mounting shaft to lock the spring to complete the clutching arrangement.

---

This invention relates to clutch mechanisms and more particularly to a clutch arrangement suitable for use with electrowindow lift systems.

Output members connected to electric drive motors must normally be arranged to slip when the apparatus driven by the output member reaches an extreme of travel. If this is not done, the electric motor may become overloaded and damaged and the possibility also exists that the drive mechanism will become damaged. Consequently, it is desirable to provide a clutch arrangement in such an installation to allow relative movement between an output member and a drive motor therefor which allows relative movement therebetween when loading exceeds predetermined limits. This mechanism must be very simple and economical to manufacture while yet carrying out the clutching action.

It is an object of the present invention to provide an improved clutch arrangement which involves a minimum number of moving parts and is economical to manufacture.

It is another object of the present invention to provide an improved clutch arrangement adapted to allow a drive gear to slip relative to a driving member when a predetermined loading on the drive gear has been exceeded.

It is a further object of the present invention to provide an improved simple fastener for use with the aforementioned type of clutch arrangement which prevents casual axial shifting of a clutch arrangement relative to a drive shaft therefor and which can be installed to allow for a wide range of preset loading of the clutch.

Further objects and advantages of the present invention will be apparent from the following description, reference being had to the accompanying drawings wherein a preferred embodiment of the present invention is clearly shown.

In the drawings:

FIGURE 1 shows a clutch assembly with the invention illustrated in its operative environment;

FIGURE 2 is a sectional view taken along line 2—2 of FIGURE 1 of the clutch arrangement of FIGURE 1;

FIGURE 3 is an exploded perspective with some parts shown in section of the clutch arrangement of FIGURE 1;

FIGURE 4 is an elevational view of a fastener of the subject invention shown in its position relative to a drive shaft before being locked relative thereto;

FIGURE 5 illustrates the fastener of FIGURE 4 in a locked position relative to a drive shaft.

Referring to FIGURE 1, a clutch and drive gear assembly, generally designated by the numeral 10, is illustrated. Drive gear 14, carried on shaft 16 might be typically driven by an output shaft of a motor. Worm gear 12 is adapted to drive another member, such as window regulator drive gear.

Referring to FIGURE 3, shaft 16 is illustrated as having key slot 18 adapted to receive a wear plate 20 and wear plate 22 positioned on either side of drive gear 14 against friction surfaces 24 thereof. It is seen that wear plates 20 and 22 are non-rotatable with respect to shaft 16 but drive gear 14 is freely rotatable thereon. Stop 26 integrally formed with shaft 16 prevents free axial movement of wear plate 20 and retains the assembly on one end of shaft 16.

Belleville spring member 28 acts against the opposite side of wear plate 22 from that engaging friction surface 24 and is operatively positioned by washer 30.

Referring to FIGURE 4, washer 30 has an irregular aperture 32 formed in the center thereof including a saw-toothed portion 34 and flat portion 36. Flat portion 36 is arranged to cooperate with flat 38 formed on shaft 16 during the assembly of the clutch and drive assembly. Grooves 40 exteriorly formed on washer 30 are sometimes referred to herein as drive means and are engaged by an appropriate tool during the assembly of the subject device to move washer 30 from the position illustrated in FIGURE 4 to the position illustrated in FIGURE 5.

It should be noted that wear plate 20, as viewed in FIGURE 2, freely slides on shaft 16 and keys in slot 18. Wear plate 20 is positioned against stop 26 and thereby prevented from moving off shaft 16 once inserted. Gear 14 slips on shaft 16 until contact is made with wear plate 20. Wear plate 22 is next inserted and engages key slot 18 so as to be non-rotatable with respect to shaft 16 in the same manner as wear plate 20. Belleville spring member 28 freely slides on a portion of shaft 16 having a lesser diameter than the diameter engaging washers 20 or 22, thereby holding gear 14 and wear plates 20 and 22 in assembled disposition. Washer 30, as located by flat 38 of shaft 16, is slid on shaft 16 until contact is made with Belleville spring member 28. Some predetermined loading is established partially compressing Belleville spring member 28 and the appropriate tool is then used to engage grooves 40. Washer 30 is then rotated from the position illustrated in FIGURE 4 to the position shown in FIGURE 5 wherein flat portions 36 and 38 are slightly deformed and saw-toothed portion 34 engages the periphery of the smaller diameter portion of shaft 16. An interference fit is established between washer 30 which prevents further casual movement of washer 30 relative to shaft 16 either rotationally or axially.

In operation, drive gear 14 as seen in FIGURE 1, is driven by some external power source so as to impart rotation to another device through worm gear 12. For purposes of this explanation, it will be assumed that that other device is a window lift regulator gear. Sufficient friction exists between plates 20 and 22 and friction surfaces 24 to allow a rotation of drive gear 14 to be imparted to worm gear 12 of shaft 16. When the loading on worm gear 12 exceeds predetermined limits, as when a window of a vehicle has been moved fully up or down, drive gear 14 will slip relative to wear plates 20 and 22 providing a clutching arrangement therefor. The amount of force necessary to cause this slipping is determined by the amount of loading on spring member 28 as held by the locked washer 30.

The utility of the subject device is particularly apparent in an environment of an electric window lift system of motor vehicle windows but it is obvious that the particular invention finds utility in any environment where a slip clutch arrangement is desirable and certain economies in the construction cost must be observed.

While the embodiment of the present invention, as herein disclosed, constitutes a preferred form, it is to be understood that other forms might be adopted.

What is claimed is as follows:

1. A clutch assembly comprising: a rotatable shaft having a flat formed thereon; gear means rotatably carried on said shaft and including friction surfaces; wear plates carried on either side of said gear means engaging said friction surfaces; spring means carried by said shaft adjacent one of said wear plates; retaining means holding one of said wear plates against axial movement; and washer means including an aperture having a flat portion for assembly and an irregular periphery engageable with said shaft by interfering therewith after rotation to maintain a predetermined loading on said spring means, said gear means arranged to rotate relative to said wear plates when gear loading exceeds the loading of said spring means.

2. A fastener comprising: a body having an annular portion formed in the center of said body; retaining means formed around the periphery of the annular portion, said retaining means including a flat formed on said annular portion and adapted to slide along a flat on a shaft member to an operative axial position; said flat formed on said annular portion adapted to be turned off the flat of said shaft member thereby deforming said body and the shaft member to form an interference engagement therebetween; and drive means exteriorly formed on said body for positioning said retaining means on a shaft member.

3. A fastener for holding substantially disc shaped members operatively positioned on a shaft, said fastener comprosing; a body of substantial washer shape adapted for sliding on a shaft to an operative position, said body having an annular portion; retaining means including a flat portion and a saw tooth portion formed around the periphery of said annular portion; and drive means formed in the periphery of said body for turning said retaining means into interfering engagement with the outer periphery of the shaft to positively hold disc shaped members in lateral and longitudinal alignment on the shaft.

4. The combination of the fastener of claim 3 and a gear rotatably mounted on a shaft, said gear being loaded against rotation by a Belleville spring member held against said gear by said fastener, said gear slipping relative to the shaft when loading thereon exceeds the retaining force of the Belleville spring as operatively positioned by said fastener.

References Cited

UNITED STATES PATENTS

| | | | |
|---|---|---|---|
| 2,191,780 | 2/1940 | Tinnerman | 85—36 X |
| 2,246,750 | 6/1941 | Murphy | 64—15 |
| 2,275,058 | 3/1942 | Draving | 85—36 |
| 2,577,319 | 12/1951 | Feitl | 85—36 |
| 2,685,812 | 8/1954 | Dmitroff. | |
| 2,862,413 | 12/1958 | Knohl | 85—36 |
| 3,032,807 | 5/1962 | Lanius | 85—36 X |
| 3,203,268 | 8/1965 | Manoni et al. | 64—30 X |

FOREIGN PATENTS

| | | |
|---|---|---|
| 883,010 | 11/1961 | Great Britain. |

HALL C. COE, *Primary Examiner.*